C. K. NAGY.
BICYCLE SLEIGH ATTACHMENT.
APPLICATION FILED JAN. 8, 1921.

1,399,643.

Patented Dec. 6, 1921.

C. K. Nagy  INVENTOR
BY Victor J. Evans
ATTORNEY

R. G. Thomas
E. Yeager
WITNESSES

UNITED STATES PATENT OFFICE.

CHARLES K. NAGY, OF HOLCOMB, NEW YORK.

BICYCLE SLEIGH ATTACHMENT.

1,399,643.  Specification of Letters Patent.  Patented Dec. 6, 1921.

Application filed January 8, 1921. Serial No. 435,939.

*To all whom it may concern:*

Be it known that I, CHARLES K. NAGY, citizen of the United States, residing at Holcomb, in the county of Ontario and State of New York, have invented new and useful Improvements in Bicycle Sleigh Attachments, of which the following is a specification.

This invention relates to bicycle attachments and has for its object the provision of a sleigh attachment including front and rear runners suitably connected to the frame of the bicycle and which further includes a toothed annulus secured upon the rear wheel of the bicycle subsequent to the removal of the tire therefrom, this annulus constituting propelling means.

The nature and advantages of the invention will be better understood when the following detail description is read in connection with the accompanying drawing, the invention residing in the combination, construction and arrangement of parts as claimed.

In the drawing forming part of this application like numerals of reference indicate the similar parts in the several views and wherein:—

Figure 1:
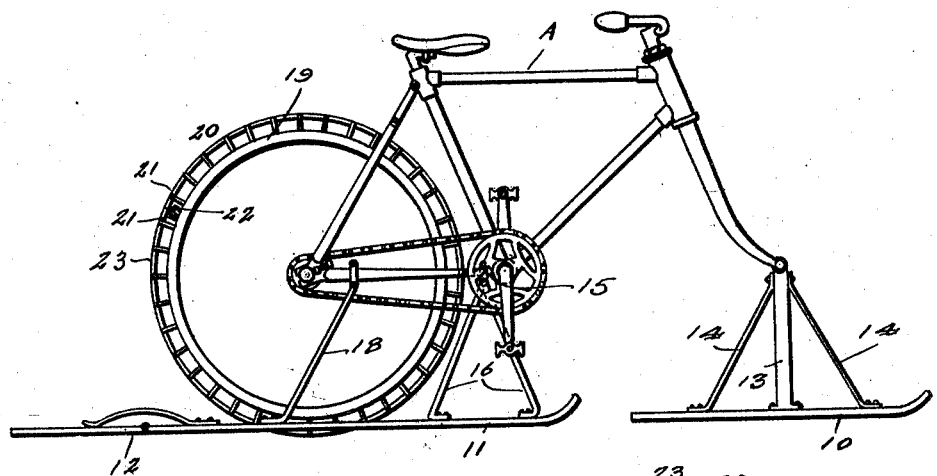
Figure 1 is a side elevation of a bicycle converted into a sled in accordance with the present invention.
Figure 3:
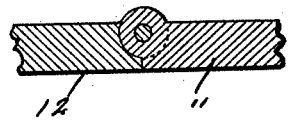
Fig. 3 is a fragmentary sectional view, showing the pivotal connection between the respective sections of the rear runner.
Figure 4:
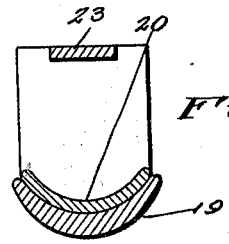
Fig. 4 is a sectional view through the tire and rim.
Figure 2:
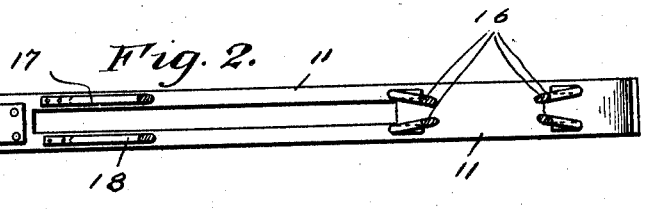
Fig. 2 is a top plan view of the rear runner.
Figure 5:
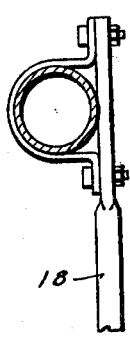
Fig. 5 is a sectional view, showing the manner of connecting the bracing element of the rear runner with the frame of the bicycle.

Referring to the drawings in detail A indicates generally a bicycle, wherein the front wheel is eliminated and one of the pair of runners associated with the front fork of the bicycle, in order to convert the latter into a sleigh. The front runner is indicated at 10 and the rear runner at 11, the rear runner including a hinged section 12. The front runner 10 includes a standard 13 which is secured between the respective members of the front fork of the bicycle, the runner being further supported by means of the bracing elements 14. The rear runner 11 is supported from the bearing 15 of the pedal crank by means of suitable elements 16 projecting upwardly from the rear runner 11, this runner being further braced from a point adjacent the axis of the rear wheel by bracing elements 17 and 18. The tire for the rear wheel 19 is first removed and a tooth annulus 20 arranged upon the rim of the wheel for propelling the device as will be readily understood. The annulus 20 is split, and the ends thereof are offset in parallelism as at 21 and connected together by means of an adjusting element 22. The rear wheel 19 is rotated by means of the chain and socket as in the ordinary bicycle construction. The invention also embodies a band 23 which is adapted to be placed about the teeth of the annulus 20 to provide for a smooth periphery for the back wheel when running over surfaces where there is very little or no snow, the band 23 thereby protecting the teeth of the annulus from injury. The attachment is extremely simple in construction, and can be applied to any make of bicycle in order to convert the latter from a bicycle to a sleigh in quick order.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. A sleigh attachment for bicycles comprising a front runner connected with the front fork of the bicycle frame subsequent to the removal of the front wheel, a rear runner connected with the lowermost rear portion of the frame, said rear runner having its rear end portion pivoted for movement in a vertical direction, a spring normally holding said pivoted section of the rear runner against movement, and a toothed annulus carried by the rear wheel subsequent to the removal of the tire therefrom.

2. A sleigh attachment for bicycles comprising front and rear runners secured to the front and rear forks of the bicycle frame, a toothed annulus secured upon the rim of the rear wheel subsequent to the removal of the tire therefrom, and a band extending around the free ends of the teeth of the annulus.

In testimony whereof I affix my signature.

CHARLES K. NAGY.